United States Patent
Zhu et al.

(10) Patent No.: US 10,367,906 B2
(45) Date of Patent: Jul. 30, 2019

(54) METHOD AND APPARATUS FOR SECURE CONTENT DELIVERY FROM A TELECOMMUNICATION NETWORK CACHE

(71) Applicants: Zhongwen Zhu, Saint-Laurent (CA); Makan Pourzandi, Montreal (CA)

(72) Inventors: Zhongwen Zhu, Saint-Laurent (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 15/544,779

(22) PCT Filed: Feb. 2, 2015

(86) PCT No.: PCT/IB2015/050796
§ 371 (c)(1),
(2) Date: Jul. 19, 2017

(87) PCT Pub. No.: WO2016/124972
PCT Pub. Date: Aug. 11, 2016

(65) Prior Publication Data
US 2018/0278712 A1    Sep. 27, 2018

(51) Int. Cl.
| | |
|---|---|
| *G06F 13/00* | (2006.01) |
| *H04L 29/08* | (2006.01) |
| *H04L 29/06* | (2006.01) |
| *H04W 76/10* | (2018.01) |
| *H04L 9/08* | (2006.01) |
| *H04W 84/04* | (2009.01) |

(52) U.S. Cl.
CPC ...... *H04L 67/2842* (2013.01); *H04L 63/0428* (2013.01); *H04W 76/10* (2018.02); *H04L 9/0816* (2013.01); *H04L 63/306* (2013.01); *H04L 69/16* (2013.01); *H04W 84/042* (2013.01)

(58) Field of Classification Search
CPC ............ H04L 67/2842; H04L 63/0428; H04L 9/0816; H04L 63/306; H04L 69/16; H04W 76/10; H04W 84/042
USPC .......... 709/227–229, 217–219; 726/3–15, 26
See application file for complete search history.

(56) References Cited

U.S. PATENT DOCUMENTS

| | | | | |
|---|---|---|---|---|
| 9,203,627 | B2 * | 12/2015 | Edstrom | H04L 63/0823 |
| 9,307,450 | B2 * | 4/2016 | Skog | H04W 28/14 |
| 10,116,697 | B2 * | 10/2018 | Beckman | H04L 63/105 |
| 2004/0015725 | A1 | 1/2004 | Boneh et al. | |

(Continued)

OTHER PUBLICATIONS

"Content Delivery Network", uploaded from Wikipedia on Jun. 20, 2017, 9 pages.
International Search Report, dated Oct. 15, 2015; 4 pages.

*Primary Examiner* — Kenneth R Coulter
(74) *Attorney, Agent, or Firm* — Julie Dufort; Ericsson Canada Inc.

(57) ABSTRACT

According to one aspect, the teachings herein disclose a method and apparatus for a providing content over a secure connection to a subscriber device, where the content is advantageously securely delivered from a cache local to the telecommunication network. Such operation is based on intercepting a secure connection request from the subscriber device and establishing a corresponding secure session between the subscriber device and a local network data center, rather than the remote content provider targeted by the request.

16 Claims, 12 Drawing Sheets

(56) References Cited

U.S. PATENT DOCUMENTS

| | | | |
|---|---|---|---|
| 2012/0023241 A1* | 1/2012 | Goel | H04L 63/0428 |
| | | | 709/228 |
| 2012/0209942 A1 | 8/2012 | Zehavi et al. | |
| 2014/0101441 A1* | 4/2014 | Edstrom | H04L 63/0823 |
| | | | 713/156 |
| 2014/0280679 A1 | 9/2014 | Dey et al. | |
| 2015/0016256 A1 | 1/2015 | Skog et al. | |
| 2015/0089673 A1* | 3/2015 | Beckman | H04L 63/105 |
| | | | 726/29 |

\* cited by examiner

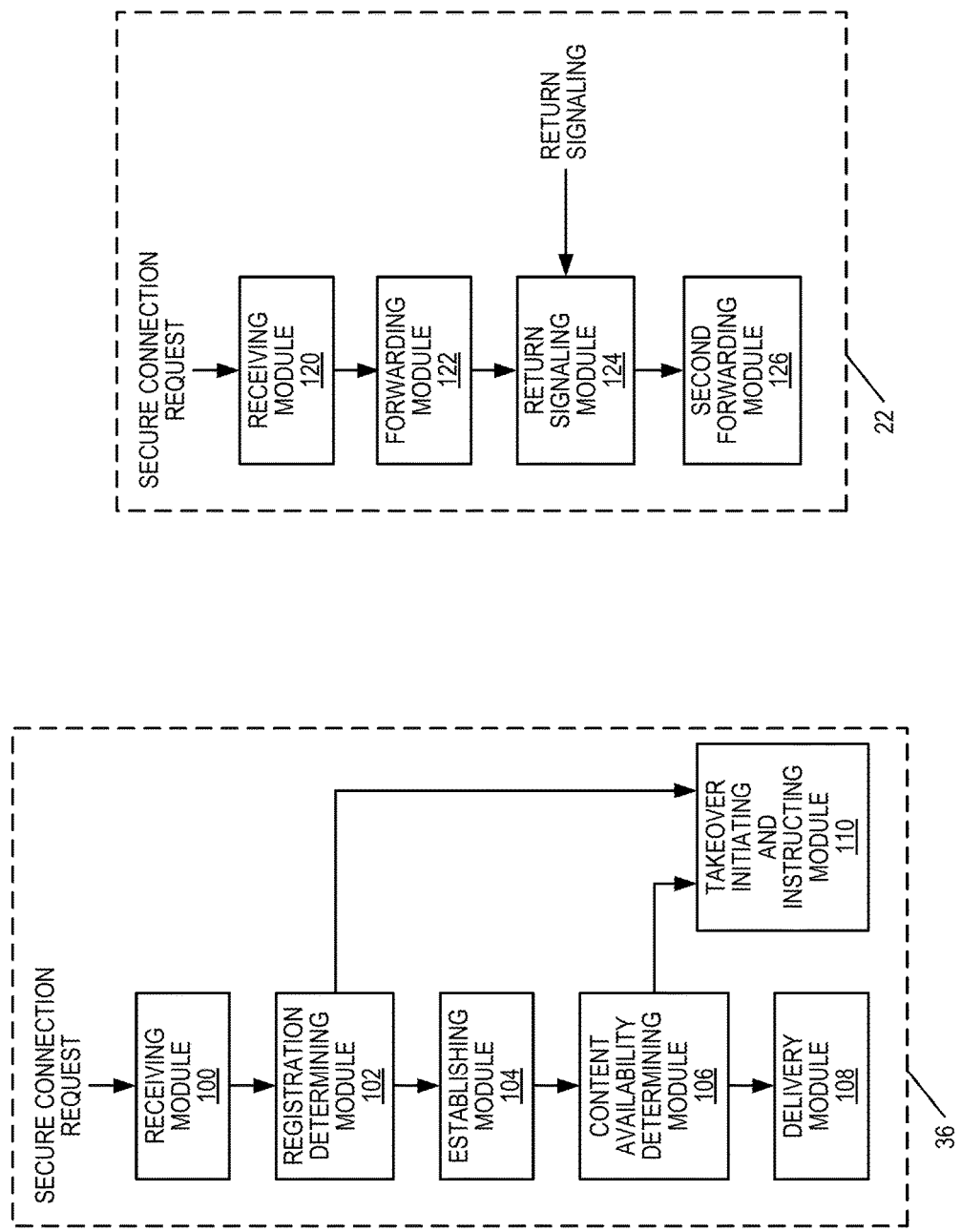

METHOD AND APPARATUS FOR SECURE CONTENT DELIVERY FROM A TELECOMMUNICATION NETWORK CACHE

TECHNICAL FIELD

The present invention generally relates to telecommunication networks and particularly relates to a network data center of telecommunication network that is configured for secure content caching and delivery.

BACKGROUND

Traditional Content Delivery Networks or CDNs often use some form of content caching, which caches at least the more popular content in caches that are ideally as close to the network edge as possible. For example, a given telecommunications network provides access to one or more content providers whose servers are available via the Internet or other Packet Data Networks, PDNs. Rather than delivering all content from the external servers of the content providers, the telecommunications network operates as a "man in the middle," by intercepting content requests and servicing at least some of those requests from in-network caches holding local copies of the requested content. In one such example, the telecommunications network comprises a cellular network wherein the Radio Access Network, RAN, portion of the cellular network includes one or more content caches from which targeted content is delivered with higher efficiency and less back-end network burden than would be obtained if the content were sourced from the corresponding external content provider or providers.

One of the more basic requirements associated with the above caching scheme is the ability of the telecommunications network to identify the particular content—e.g., a particular movie or other multimedia file—targeted by a given content request originating from one of the network's subscribers. The network easily identifies targeted content when the incoming content requests are unsecured, but secure connection requests are problematic not least because the traditional mechanisms establish the secure end-to-end, E2E, connection between the requesting subscriber device and a remote server of the targeted content provider. The encrypted traffic and signaling flowing between those two endpoints passes transparently through the telecommunications network, leaving no opportunity for the telecommunications network to identify and deliver cached content over the secure connection.

SUMMARY

According to one aspect, the teachings herein disclose a method and apparatus for providing content over a secure connection to a subscriber device, where the content is advantageously securely delivered from a cache local to the telecommunication network. Such operation is based on intercepting a secure connection request from the subscriber device and establishing a corresponding secure session between the subscriber device and a local network data center, rather than the remote content provider targeted by the request.

In one embodiment, a method of providing content over a secure connection to a subscriber device of a telecommunication network includes receiving a secure connection request from the subscriber device. The secure connection request is received at a first communication interface of a network data center that is internal to the telecommunication network, and the request is directed to an external network address associated with an external content provider that is external to the telecommunication network. The method further includes determining whether or not the external content provider is registered for secure-content caching in the network data center, and, responsive to determining that the external content provider is registered, establishing a secure session between the network data center and the subscriber device. This operation includes establishing a session key for encrypting communications over the secure session.

Further, the method includes determining whether content targeted by the secure connection request is available from a content cache of the network data center and, responsive to determining that the targeted content is available from the content cache, delivering the targeted content from the content cache to the subscriber device using the secure session. The method also includes, responsive to determining that the targeted content is not available from the content cache, initiating a takeover of the secure session by the external content provider by forwarding session information towards the external content provider via a second communication interface of the network data center. Here, the session information includes the session key, a network address of the subscriber device, and identification of the targeted content, and the method further includes instructing the telecommunication network to forward all subsequent session messages from the subscriber device for the secure session towards the external content provider rather than towards the network data center.

In a related embodiment, a network data center is configured for operation in a telecommunication network and is further configured for providing content over a secure connection to a subscriber device of the telecommunication network. The example network data center includes at least one network node that comprises a first communication interface configured to receive a secure connection request from the subscriber device. The secure connection request is directed to an external network address associated with an external content provider that is external to the telecommunication network. The at least one network node further includes processing circuitry that is configured to determine whether or not the external content provider is registered for secure-content caching in the network data center.

Further, responsive to determining that the external content provider is registered, the processing circuitry is configured to establish a secure session between the network data center and the subscriber device, including establishing a session key for encrypting communications over the secure session. The processing circuitry is also configured to determine whether content targeted by the secure connection request is available from a content cache of the network data center and, responsive to determining that the targeted content is available from the content cache, deliver the targeted content from the content cache to the subscriber device using the secure session.

Still further, the processing circuitry is, responsive to determining that the targeted content is not available from the content cache, configured to initiate a takeover of the secure session by the external content provider by forwarding session information towards the external content provider via a second communication interface of the network data center. The session information includes the session key, a network address of the subscriber device, and identification of the targeted content. Correspondingly, the processing circuitry is configured to instruct the telecommunication network to forward all subsequent session messages from the subscriber device for the secure session towards the external content provider rather than towards the network data center.

In another embodiment, a network node is configured to operate as a serving packet gateway in a telecommunication network with respect to subscriber devices operating in the telecommunication network. The example serving packet gateway includes a first communication interface that is configured to receive a secure connection request originating from one of the subscriber devices. The secure connection request targets an external network address associated with a content provider that is external to the telecommunication network, and the network node includes processing circuitry that is configured to recognize the secure connection request and forward the secure connection request towards a network data center within the telecommunication network.

This forwarding to the network's internal data center is done rather than forwarding the secure connection request towards a packet data network gateway of the telecommunication network, for forwarding towards the external content provider. The processing circuitry of the network node is further configured to receive return signaling from the network data center indicating whether or not the secure connection request will be handled by the network data center and, responsive to determining that the secure connection request will not be handled by the network data center, forward all subsequent related messages from the subscriber device towards a packet data network gateway, rather than to the network data center, for forwarding to the external content provider.

A related further embodiment involves a method at a network node that is configured to operate as a serving packet gateway in a telecommunication network with respect to subscriber devices operating in the telecommunication network. The example method includes receiving a secure connection request originating from one of said subscriber devices, where the secure connection request targets an external network address associated with an external content provider that is external to the telecommunication network. Further, the method includes forwarding the secure connection request towards a network data center within the telecommunication network, rather than forwarding the secure connection request towards a packet data network gateway of the telecommunication network, for forwarding towards the external content provider. Additionally, the method includes the network node receiving return signaling from the network data center indicating whether or not the secure connection request will be handled by the network data center and, responsive to determining from the return signaling that the secure connection request will not be handled by the network data center, forwarding all subsequent related messages from the subscriber device towards a packet data network gateway, rather than to the network data center, for forwarding to the external content provider.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a block diagram of processing modules implemented via processing circuitry in one embodiment of a network data center.

FIG. 6 is a block diagram of processing modules implemented via processing circuitry in one embodiment of a serving packet gateway.

DETAILED DESCRIPTION

Figure 1:
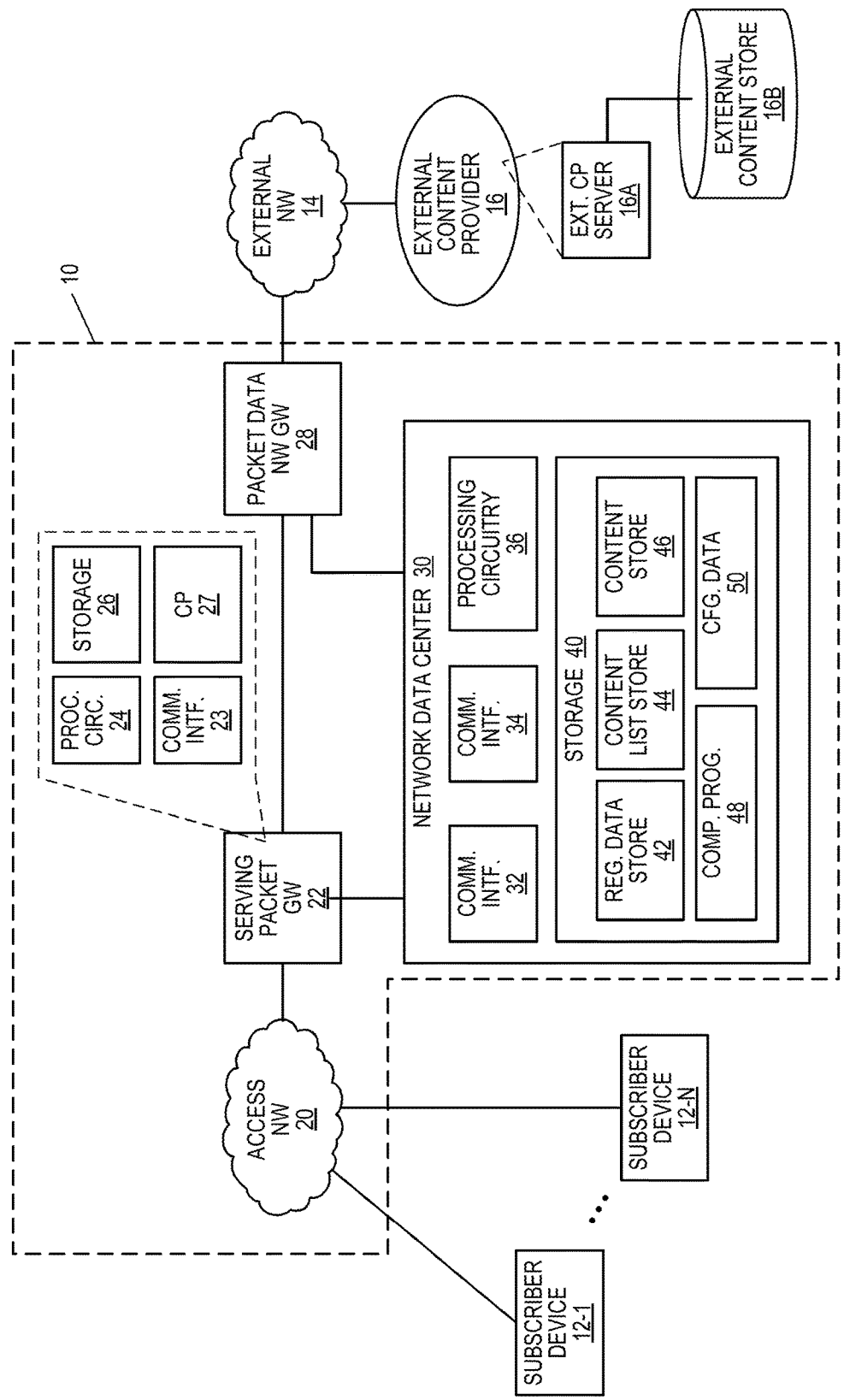
FIG. 1 is a block diagram of one embodiment of a telecommunication network that includes a network data center configured for secure content caching and delivery.

FIG. 1 illustrates an example embodiment of a telecommunication network 10 that provides communication services to any number of subscriber devices 12, e.g., devices 12-1 through 12-N. Among the several communication services provided by the network 10, one sees that the network 10 communicatively couples to an external network 14, such as the Internet and/or another Packet Data Network, PDN. In turn, the external network 14 provides access to an external content provider 16. Here, in terms of network connectivity and communication purposes, the external content provider 16 is represented as, e.g., an external content provider server 16A and an associated external content store 16B that holds electronic content, such as movies, videos and/or other electronic content. Of course, there may be a potentially large number of external content providers 16 reachable by subscriber devices 12 via communications carried through the network 10 and the external network 14.

The telecommunication network 10—hereafter "network 10"—supports these and other types of subscriber-related communications via an access network 20, which in an example case comprises a cellular radio network or other type of Radio Access Network or RAN. In fact, the access network 20 may use more than one radio access technology—such as local Wireless LAN intermixed with wide-area cellular access—and in general may comprise a mix of access technologies.

Figure 3:
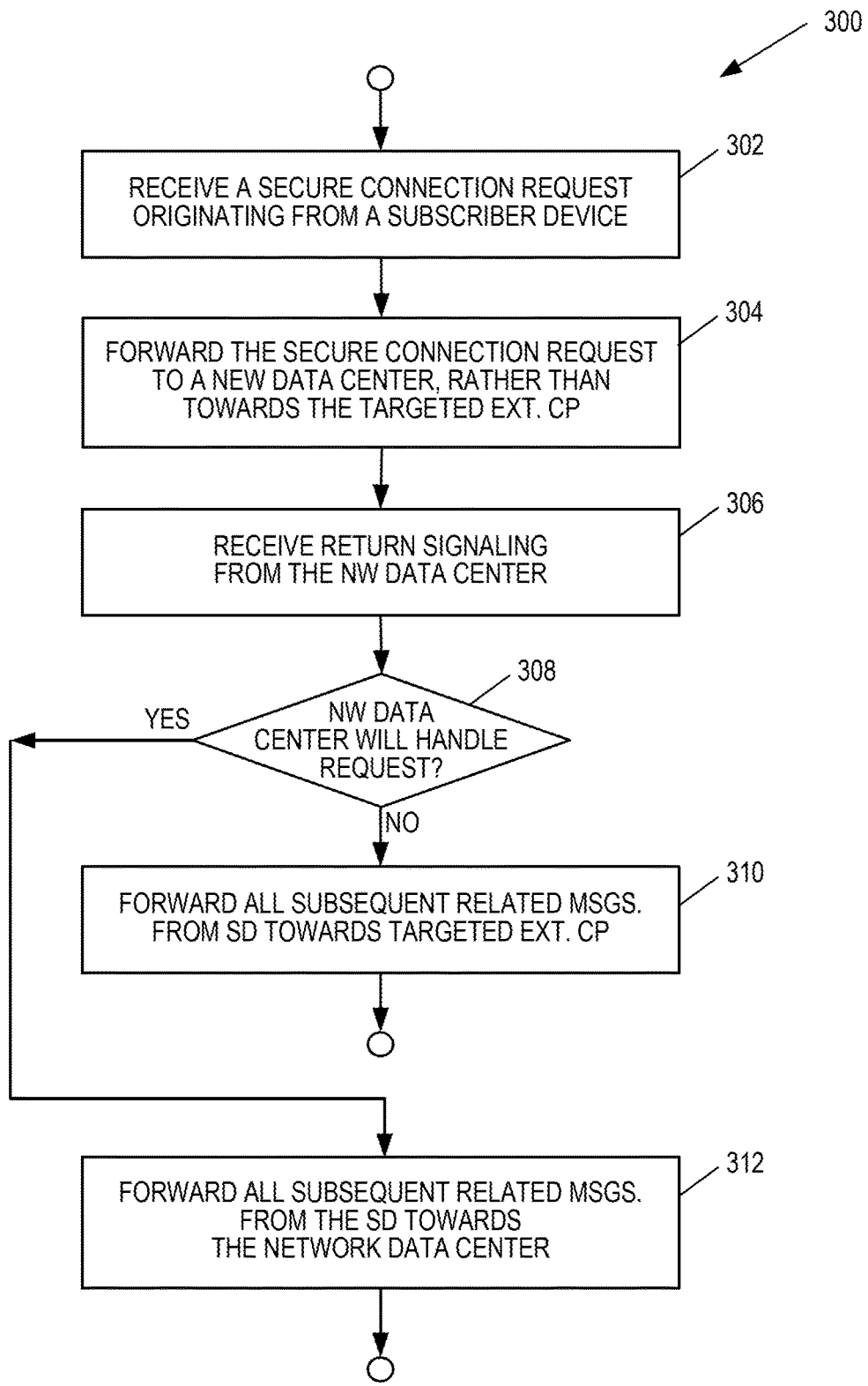
FIG. 3 is a logic flow diagram of one embodiment of a method of processing at a serving gateway communicatively coupled to a network data center.

The network 10 further includes one or more core network entities, including a serving packet gateway 22 that comprises one or more communication interfaces 23, processing circuitry 24 and storage 26, which stores, e.g., configuration information. In at least some embodiments, the storage 26 provides non-transitory storage for a computer program 27, the execution of which at least partly configures the serving packet gateway 22 according to the teachings herein. For example, in at least one embodiment, the computer program 27 comprises program instructions that configure the processing circuitry 24 to carry out the processing disclosed in the method 300, as shown in FIG. 3 and as discussed elsewhere in this disclosure. Further, in addition to performing the new operations as disclosed herein, the serving packet gateway 22 performs conventional support operations, such as packet routing for mobility of given subscriber devices 12 within the access network 20. Further, the network 10 includes a packet data network gateway 28, which provides the top-level packet interface to the external network 14.

The network 10 further includes network data center 30 that is configured for operation in association with the network 10 and is further configured for providing content over a secure connection to any given one of the subscriber devices 12. The network data center 30 comprises one or more node and, whether consolidated in one node or distributed across two or more physical, interconnected nodes, it includes a first communication interface 32, a second communication interface 34, processing circuitry 36 and storage 40.

The storage 40 comprises one or more types of computer-readable media, such as volatile memory for working data and non-volatile memory for persistent data. Non-limiting examples include SRAM and/or DRAM and FLASH or EEPROM or Solid State Disk, SSD, storage. Regardless of the circuitry or device type(s) used to implement the storage 40, in an example configuration, the storage 40 stores a registration data store 42, a content list store 44, and a content store 46. These "stores" shall be understood as electronic data stored in some organized fashion, e.g., in structured or database form.

In at least some embodiments, the storage 40 provides non-transitory storage for a computer program 48 and various configuration data 50. Correspondingly, the processing circuitry 36, in at least some embodiments, comprises digital processing circuitry that is configured to perform the network data center teachings disclosed herein at least in part based on its execution of computer program instructions comprising the computer program 48. For example, the computer program 48 comprises program instructions that configure the processing circuitry 36 to carry out the method 200 discussed later herein in the context of FIG. 2. To that end, the processing circuitry 36 in one or more embodiments comprises one or more microprocessors, Digital Signal Processors, Field Programmable Gate Arrays, Application Specific Integrated Circuits, or any mix thereof. More broadly, the processing circuitry 36 comprises fixed circuitry, programmed circuitry, or any mix thereof.

As for functionality and configurations of interest to this discussion, the first communication interface 32 is configured to receive a secure connection request from the subscriber device 12, the secure connection request being directed to an external network address associated with an external content provider 16 that is external to the telecommunication network 10. Here, the phrase "from the subscriber device 12" does not necessarily mean that the request flows directly from the subscriber device 12 to the network data center 30 and, indeed, in one or more contemplated embodiments, the request flows from the subscriber device 12 through the access network 20, and on to the serving packet gateway 22, which forwards it to the network data center 30. In general, in this disclosure and unless otherwise noted, receiving data or signaling "from" a given entity encompasses both direct and indirect receipt. Further, the secure connection request is "directed to the external network address" in the sense that the subscriber device 12 originated and sent the request to include addressing or other information identifying to the external content provider 16 as the intended recipient of the request.

The first communication interface 32 comprises physical interface and protocol processing circuitry, as needed, to communicatively couple the network data center 30 to the serving packet gateway 22, which itself includes a corresponding interface to anchor its end of the communications between the serving packet gateway 22 and the network data center 30. Correspondingly, the processing circuitry 36 of the network data center 30 is operatively associated with the first communication interface 32 and is configured to determine whether or not the external content provider 16—i.e., the one targeted by the example incoming secure content request—is registered for secure-content caching in the network data center 30. Further, the processing circuitry 36 is configured to, in response to determining that the external content provider 16 is registered, establish a secure session between the network data center 30 and the subscriber device 12, including establishing a session key for encrypting communications over the secure session.

It will be appreciated that the secure session is established via the network 10, e.g., as supported by the logical and physical bearers provided by the network 10, including the radio or other communication links provided by the access network 20. A non-limiting but significant advantage gained by these operations is that intercepting the secure connection request and correspondingly establishing the secure connection at the network data center 30 allows the network 10 to securely serve targeted content from local caching that would otherwise necessarily have to be served from external caching associated with the external content provider 16 targeted by the secure connection request.

As an example, when a secure connection is used between a user and a content provider, for example for an HTTPS connection, the message contents are encrypted using crypto keys. Processing such messages therefore requires decryption or, put another way, the contents of these encrypted messages are not visible to the network services used to convey them between the user and content provider endpoints. However, in the advantageous arrangement disclosed herein, the network data center 30 serves as one of the secure connection endpoints, and it decrypts the message content as explained herein. This arrangement allows the data center 30 to read and process messages flowing on the secure connection, and to serve content from network data center caching or redirect the requests to the corresponding external content provider if the targeted content is not cached.

Thus, the network 10 is configured to intercept at least some secure connection requests and forward them to the network data center 30, which then establishes secure sessions with the requesting subscriber devices 12 and determines whether or not it can service the content requests indicated via the secure sessions. If so, the network data center 30 advantageously handles content delivery and, if not, the network data center 30 advantageously transfers or hands over the secure session to the appropriate external content provider 16.

In particular, in some embodiments, the processing circuitry 36 of the network data center 30 is configured to determine whether content targeted by a given secure connection request is available from the content cache 46 of the network data center 30, and, in response to determining that the targeted content is available from the content cache 46, deliver the targeted content from the content cache 46 to the subscriber device 12 using the secure session established between the subscriber device 12 and the network data center 30.

On the other hand, if the processing circuitry 36 determines that the targeted content is not available from the content cache 46, the processing circuitry 36 is configured to initiate a takeover of the secure session by the external content provider 16. The processing circuitry 36 initiates the takeover by forwarding session information towards the external content provider 16 via the second communication interface 34 of the network data center 30, and by instructing the network 10 to forward all subsequent session messages from the subscriber device 12 for the secure session towards the external content provider 16, rather than towards the network data center 30.

The content may be considered as being unavailable from the content cache 46 if the targeted content is not present in the content cache 46 and is a type of content not appropriate or permitted for caching—e.g., personally sensitive data that is not intended for serving to more than one user. Further, in a more general case where the targeted content is not already present in the content cache 46, the processing circuitry 36 in one or more embodiments does not attempt to retrieve the targeted content from an external source and then serve the request from the content cache 46, and instead redirects the request to the appropriate external content provider 16.

Consider an example where the targeted content is not in the content cache 46—which, for example, may be treated as different or segregated caches corresponding to different external content providers 16. The processing circuitry 36 sends a request to the external content provider 16 for the targeted content and receives a response message in return. For example, it receives a 200 OK response that includes a message 403, 404, or any kind defined error message embedded in the response. Such an error message may be included, e.g., in cases where the targeted content is personal, sensitive data not appropriate for caching in the network data center 30. For example, the targeted content may be bank account or credit card account information. In response to receiving the error message, the processing circuitry 36 decides to handover or otherwise transfer the secure connection to the targeted external content provider 16, so that the external content provider 16 can handle the transaction.

The decision not to fetch missing content into the content cache 46 may be made on a case-by-case basis, or may be a matter of fixed configuration, or may be a function of any one or more of the following parameters: radio link and/or internal network link loading levels, the identity of the external content provider 16 associated with the targeted content, the type of targeted content, and a file size or content amount associated with the targeted content.

In any case, for redirecting the request to the appropriate external content provider 16, the session information provided to the external content provider 16 includes the session key, a network address of the involved subscriber device 12, and identification of the targeted content. By including for example, the session key and an indication of the targeted content and subscriber identification information, the network data center 30 advantageously provides the external content provider 16 with everything needed to reestablish the network-end of the secure session at the external content provider 16 and therefore avoid the inefficiencies that would otherwise arise if the subscriber device 12 were forced to establish a new secure session.

In an example embodiment, the processing circuitry 36 is configured to instruct the network 10 to forward all subsequent session messages from the subscriber device 12 for the secure session towards the external content provider 16, by sending control signaling to the serving packet gateway 22 via the first communication interface 32. Further, in the same or other embodiments, the external content provider 16 comprises an external content delivery network that is accessible via the external packet data network(s) 14, and the processing circuitry 36 is configured to initiate the takeover of the secure session by the external content provider 16 by initiating a communication with the external content delivery network via the second communication interface 34. The second communication interface 34 comprises, for example, physical interface circuitry and protocol processing circuitry, as needed, to communicatively couple the network data center 30 to the external content provider 16, e.g., via communications carried through the packet data network gateway 28.

In a further operational detail, in some embodiments, the processing circuitry 36 is configured to initiate the takeover of the secure session by the external content provider 16 by transferring a protocol endpoint established at the network data center 30 for the secure session to the external content provider 16. For example, in at least one such embodiment, the processing circuitry 36 is configured to transfer the protocol endpoint based on performing a Transfer Control Protocol Connection Passing, TCPCP, operation, to pass a TCP endpoint from the network data center 30 to the external content provider 16, or by transferring a Transport Layer Security, TLS, protocol endpoint from the network data center 30 to the external content provider 16.

In another aspect of the above operations, in one or more embodiments, the processing circuitry 36 is configured to determine whether or not any given external content provider 16 is registered for secure-content caching in the network data center 30 by accessing the registration data store 42 in the network data center 30, to determine whether the registration data store 42 contains registration information corresponding to domain name information conveyed in the involved secure connection request. That is, a given subscriber device 12 sends a secure connection request, and the serving packet gateway 22 intercepts that request and forwards it to the network data center 30. In turn, the processing circuitry 36 of the network data center 30 accesses the registration data store 42 using the domain name information indicated in the secure connection request—which information identifies the particular external content provider 16 targeted by the request—and determines whether the registration data store 42 indicates that the targeted external content provider 16 is registered at the network data center 30. Such registration may be based on a defined business arrangement and may include manual or automated provisioning of the registration data store 42, to reflect registration statuses.

Similarly, for given targeted content, the processing circuitry 36 of the network data center 30 may be configured to determine whether the targeted content is available from the content cache 46 of the network data center 30 by accessing the content-listing data store 44. In particular, the processing circuitry 36 determines whether the content-listing data store 44 contains listing information corresponding to a content identifier conveyed in the secure connection request.

The network data center 30 may be implemented in a single node, e.g., a computer server with a CPU, storage, and communication interfaces. Or, the network data center 30 may be implemented in more than one node, which may or may not be co-located, but which are communicatively interlinked to achieve the overall functionality contemplated herein. However, as illustrated in the example of FIG. 2, it is contemplated herein to configure a network data center 30, regardless of its implementation architecture, to carry out a method 200 that enables the secure delivery of locally cached content in lieu of conventionally sourcing of that content from a targeted external content provider 16.

Figure 2:
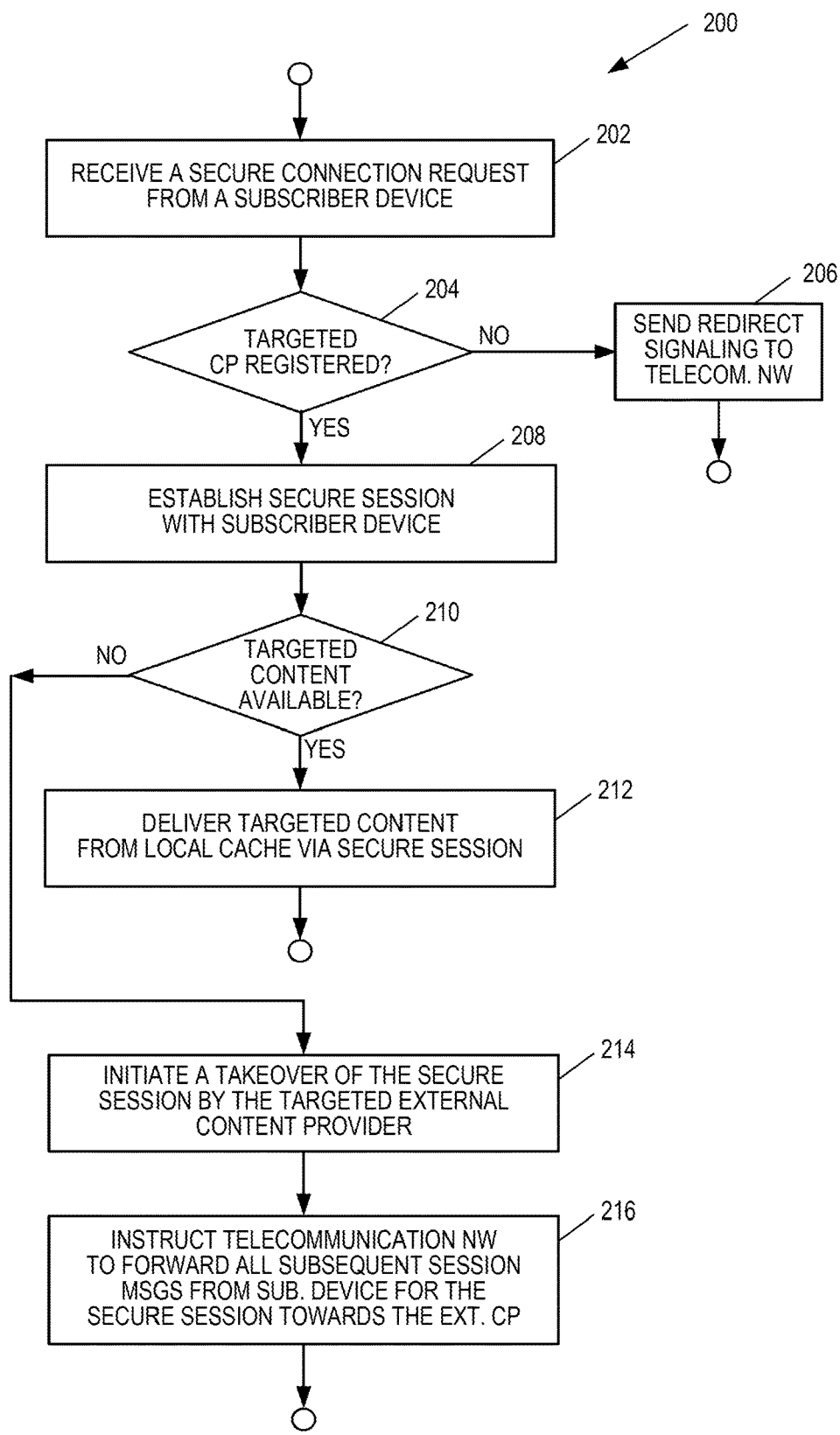
FIG. 2 is a logic flow diagram of one embodiment of a method of processing at a network data center.

According to the example embodiment seen in FIG. 2, the contemplated method 200 includes receiving (Block 202) a secure connection request from a subscriber device 12. The secure connection request is received at a first communication interface 32 of a network data center 30 that is internal to the network 10 and is directed to an external network address associated with an external content provider 16.

The method 200 further includes determining (Block 204) whether or not the external content provider 16 is registered for secure-content caching in the network data center 30. If the content provider 16 is not registered, then processing in this example embodiment continues with sending redirect signaling to the network 10 (Block 206), e.g., so that the serving packet gateway 22 will redirect secure-connection messages from the subscriber device 12 to the targeted external content provider 16, rather than to the network data center 30.

Conversely, in response to determining that the external content provider 16 is registered (YES from Block 204), the method 200 continues with establishing (Block 208) a secure session between the network data center 30 and the subscriber device 12. These operations include establishing a session key for encrypting communications over the secure session. The method 200 further includes determining (Block 210) whether content targeted by the secure connection request is available from the content cache 46 of the network data center 30 and, in response to determining that the targeted content is available from the content cache 46 (YES from Block 210), delivering (Block 212) the targeted content from the content cache 46 to the subscriber device 12 using the secure session.

On the other hand, in response to determining that the targeted content is not available from the content cache 46 (NO from Block 210), the method 200 includes initiating (Block 214) a takeover of the secure session by the external content provider 16. The takeover is initiated by forwarding session information towards the external content provider 16 via a second communication interface 34 of the network data center 30. As before, the session information includes the session key, a network address of the subscriber device 12, and identification of the targeted content. Initiating the takeover further includes or is followed by instructing (Block 216) the network 10 to forward all subsequent session messages from the subscriber device 12 for the secure session towards the external content provider 16 rather than towards the network data center 30.

For example, in a given embodiment, a given serving packet gateway 22 in the network 10 is configured to forward at least some of the secure connection requests incoming to it from subscriber devices 12 towards the network data center 30, rather than towards the external content providers 16 targeted by those requests. However, for any secure connection request that will not be handled by the network data center 30, the network data center 30 can send signaling to the serving gateway 22 that instructs the serving gateway 22 to pass any further session messages for that session and that subscriber device 12 along towards the originally targeted external content provider 16.

In looking at an example serving gateway 22, it is contemplated herein to configure a network node to operate as a serving packet gateway 22 in the network 10 with respect to subscriber devices 12 operating in the network 10. These subscriber devices 12 comprise essentially any type of communication apparatus, such as cellular smartphones or feature phones, tablets, laptop or other computers, network adaptors, or other devices having a communications transceiver adapted to communicate and operate within the network 10. In a non-limiting example, the access network 20 shown in FIG. 1 is a cellular communication network configured according to a Third Generation Partnership Project, 3GPP, standard, such as the Release 8, 9, 10 or 11 standards that define the so called Long Term Evolution, LTE, and LTE Advanced standards.

The serving gateway 22 comprises a first one of the one or more communication interfaces 23 that is configured to receive a secure connection request originating from one of the subscriber devices 12. The connection request is carried over the access network 20 and provided to the serving packet gateway 22 from a serving base station or other supporting node in the network 10. More particularly, the secure connection request is targeted to an external network address associated with a content provider that is external to the telecommunication network 10 and the serving packet gateway 22 includes processing circuitry 24 that is configured to recognize the secure connection request and forward the secure connection request towards a network data center 30 within the network 10, rather than forwarding the secure connection request towards the packet data network gateway 28 of the network 10, as would be done conventionally for forwarding by the packet data network gateway 28 towards the targeted external content provider 16.

The processing circuitry 24 is further configured to receive return signaling from the network data center 30 indicating whether or not the secure connection request will handled by the network data center 30. In response to determining that the secure connection request will not be handled by the network data center 30, the processing circuitry 24 is configured to forward all subsequent related messages from the subscriber device 12 towards a packet data network gateway 28, rather than to the network data center 30, for forwarding—by the packet data network gateway 28—to the external content provider 16.

This operation advantageously provides the network data center 30 the opportunity to determine whether it can or otherwise will handle any given secure connection request, while still providing the opportunity for the subscriber device 12 to communicate directly with the targeted external content provider 16 in a case where the network data center 30 will not handle the secure connection request. Of course, in a case where the secure connection request will be handled by the network data center 30, the processing circuitry 24 of the serving packet gateway 22 is configured to forward all of the subsequent related messages from the subscriber device 12 towards the network data center 30.

FIG. 3 illustrates an example embodiment of a method 300 that corresponds to the operations described above for the serving packet gateway 22. The method 300 includes receiving (Block 302) a secure connection request originating from one of the subscriber devices 12. The secure connection request is targeted to an external network address associated with an external content provider 16 that is external to the network 10, and the method 300 includes forwarding (Block 304) the secure connection request towards the network data center 30, rather than towards the packet data network gateway 28 of the network 10, for forwarding towards the external content provider 16.

Additionally, the method 300 includes receiving (Block 306) return signaling from the network data center 30 indicating whether or not the secure connection request will handled by the network data center 30. In response to determining from the return signaling that the secure connection request will not be handled by the network data center 30 (NO from Block 308), the method 300 includes forwarding (Block 310) all subsequent related messages from the subscriber device 12 towards the packet data network gateway 28, rather than to the network data center 30, for forwarding by the packet data network gateway 28 to the external content provider 16.

On the other hand, if the return signaling indicates that the network data center 30 will handle the secure connection request (YES from Block 308), the method 300 includes forwarding (Block 312) all subsequent related messages from the subscriber device 12 towards the network data center 30. Here, "related" messages are those messages involved in the secure connection being established between the network data center 30 and the subscriber device 12.

Figure 4:
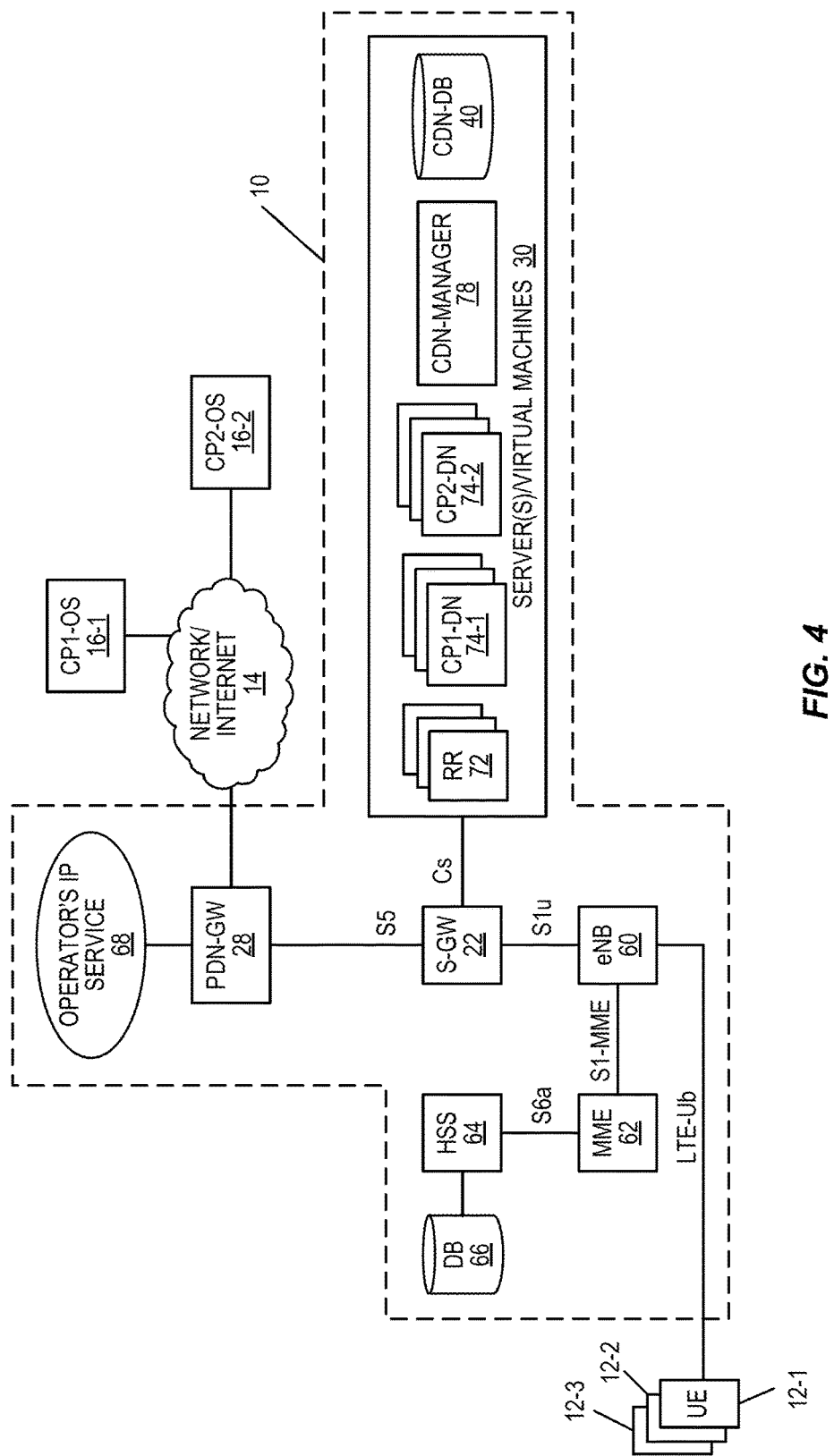
FIG. 4 is a block diagram of another embodiment of a telecommunication network that includes a network data center configured for secure content caching and delivery.

FIG. 4 illustrates a more detailed but non-limiting example of the network 10 and uses nomenclature associated with the LTE specifications promulgated by the 3GPP. Thus, while not explicitly numbered as the "access network 20" in FIG. 4, one sees an "eNode" or "eNB" 60 providing radio access to a number of subscriber devices 12, labeled as "UEs" in the 3GPP parlance. The eNB 60 interfaces to a Mobility Management Entity or MME 62, which in turn couples to a Home Subscriber Server 64 that maintains a database 66 of subscriber identities, subscription information, etc.

The aforementioned serving packet gateway 22 is also shown in communicative connection with the eNB 60 and the MME 62 and it will be understood that signaling from the subscriber devices 12, such as secure connection requests, etc., will pass through the eNB 60 and into the serving packet gateway 22. Of course, there may be a plurality of serving packet gateways 22, each one serving given subscriber devices 12 that are currently active in given areas of the network 10.

The illustrated serving packet gateway 22 is communicatively coupled to the packet data network gateway 28, which has been previously described, and that node in turn is coupled to an operator's Internet Protocol, IP, service network 68, and, of course, to the external network 14. In the illustration, two external content providers 16-1 and 16-2 are reachable through the external network 14, and they are labeled as CP1-OS and CP2-OS, respectively.

The network data center 30 comprises a plurality of logical and/or physical nodes, including a Request Router or RR 72, which initially receives incoming secure connection requests and other messages forwarded to the network data center 30 by a serving packet gateway 22. Further, the network data center 30 includes one or more content provider related delivery networks or DNs. These "delivery networks" are numbered as 74-1 and 74-2 and respectively labeled as "CP1-DN" and "CP2-DN." It will be appreciated that C1-DN is associated with the external content provider 16-1 and that CP2-DN is associated with the external content provider 16-2.

Still further, the network data center 30 includes a Content Delivery Network, CDN, manager 78, which is responsible for managing the content provider DNs 74-1, 74-2, etc. The CDN manager 78 in one or more embodiments is also the entity configured to determine whether requested content is available and whether a given secure connection request will or will not be handled by the network data center 30.

In at least one embodiment, the content provider DNs 74 are implemented as "virtual machines" or "virtual servers" on one or more computer platforms included in the network data center 30. One of the advantages of this arrangement is that the CDN manager 78 can instantiate new content provider DNs 74 as needed, or modify them dynamically. The RR 72 also is virtualized in one or more embodiments. However, in other embodiments, the content provider DNs 74 and/or the RR 72 are implemented as physical servers and, in all cases, these entities shall be understood as comprising processing circuitry specially adapted to the purposes described herein.

With the above examples in mind, FIGS. 5 and 6 illustrate an example set of processing or functional modules, as may be implemented by the respective processing circuitries of the network data center 30 and the serving packet gateway 22. As seen in example of FIG. 5, the network data center 30 includes a first module 100 that is configured to receive a secure connection request from the subscriber device 12, where the secure connection request is directed to an external network address associated with an external content provider 16 that is external to the network 10. The network data center 30 further includes a second module 102 that is configured to determine whether or not the external content provider 16 is registered for secure-content caching in the network data center 30.

Further, the network data center 30 includes a third module 104 that is, responsive to determining that the external content provider 16 is registered, configured to establish a secure session between the network data center 30 and the subscriber device 12, including establishing a session key for encrypting communications over the secure session. Still further, the network data center 30 includes a fourth module 106 configured to determine whether content targeted by the secure connection request is available from a content cache 46 of the network data center 30, and a fifth module 108 that is, responsive to determining that the targeted content is available from the content cache 46, configured to deliver the targeted content from the content cache 46 to the subscriber device 12 using the secure session.

The network data center 30 further includes a sixth module 110. In response to determining that the targeted content is not available from the content cache 46, the sixth module 110 is configured to: initiate a takeover of the secure session by the external content provider 16 by forwarding session information towards the external content provider 16 via a second communication interface 34 of the network data center 30; and instruct the network 10 to forward all subsequent session messages from the subscriber device 12 for the secure session towards the external content provider 16 rather than towards the network data center 30. The session information includes the session key, a network address of the subscriber device 12, and identification of the targeted content.

Turning to FIG. 6, a network node configured to operate as a serving packet gateway 22 includes a first module 120 that is configured to receive a secure connection request originating from a subscriber device 12, where the secure connection request is targeted to an external network address associated with an external content provider 16 that is external to the network 10. The serving packet gateway 22 further includes a second module 122 that is configured to forward the secure connection request towards a network data center 30 within the telecommunication network 10, rather than forwarding the secure connection request towards a packet data network gateway 28 of the telecommunication network 10 for forwarding by the packet data network gateway 28 towards the external content provider 16.

Still further, the serving packet gateway 22 includes a third module 124 configured to receive return signaling from the network data center 30 indicating whether or not the secure connection request will handled by the network data center 30. Correspondingly, the serving packet gateway 22 includes a fourth module 126 that is, responsive to determining from the return signaling that the secure connection request will not be handled by the network data center 30, configured to forward all subsequent related messages from the subscriber device 12 towards a packet data network gateway 28, rather than to the network data center 30, for forwarding to the external content provider 16.

Figure 7A:
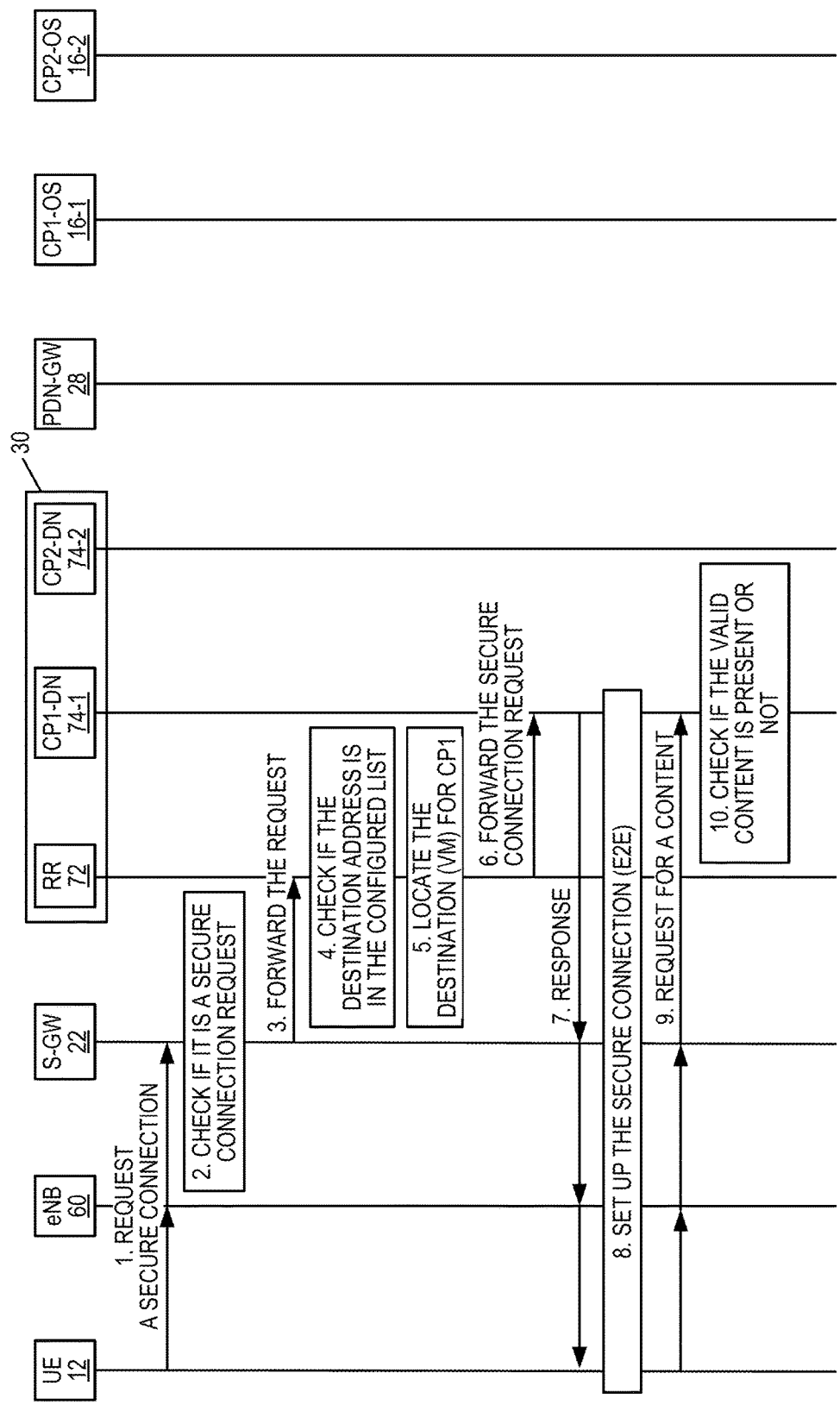
FIGS. 7-10 are signal flow diagrams of example embodiments of secure content caching delivery and control, for a network data center.
Figure 7B:
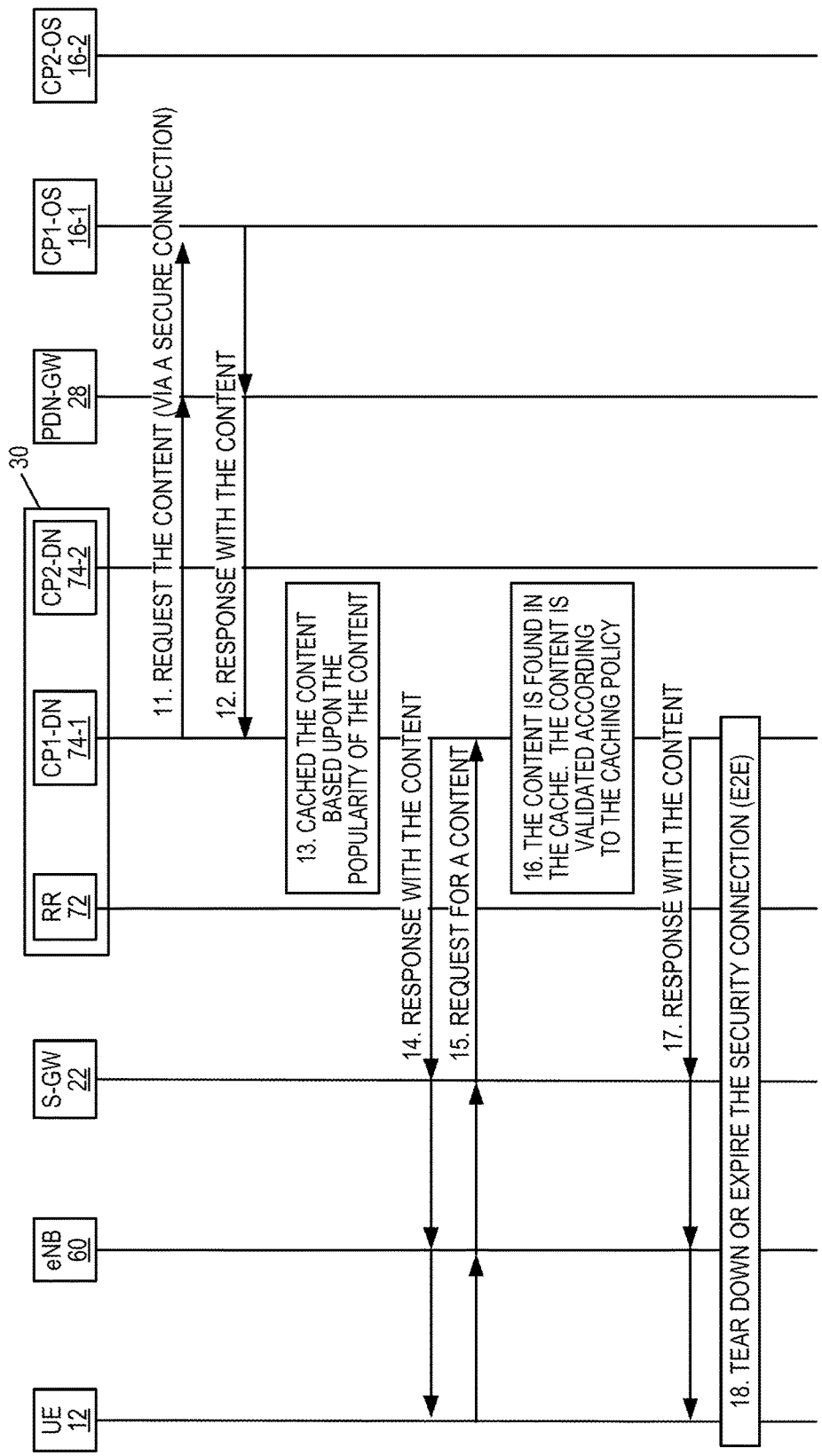

Turning now to FIG. 7, one sees a signaling flow or call flow diagram according to one embodiment contemplated herein. The entities depicted in FIG. 7 correspond to the network data center implementation seen in the example of FIG. 4. The serving packet gateway 22 is configured to direct all the secure traffic from subscriber devices 12 to the RR 72 in the network data center 30. The RR 72 checks the destination to see if it is in a list of sites that are managed by the network data center 30. If not, the RR 72 forwards the request to the requested destination. If so, the request is sent to the content provider DN 74 in the network data center 30 that corresponds to the external content provider 16 originally targeted by secure connection request from the subscriber device 12.

The network data center 30 exposes two external interfaces as shown in FIG. 4; one is a front or Cs interface towards the serving packet gateway 22 and a backend or Cg interface towards the packet data network gateway 28. The CDN Manager 78 is responsible for setting up a routing rule in the RR 72, to create a virtual machine, VM, for launching the involved content provider DN 74. The content provider DN 74 that is thereby instantiated corresponds to the targeted external content provider 16 and it becomes the secure end point to provide the secure connection with the subscriber device 12.

After the secure communication is established, the dedicated content provider DN 74 determines whether the targeted content as requested by the subscriber device 12 is available in the content cache 46 of the network data center 30. If not, the content provider DN 74 can fetch the content from the external content provider 16 directly, using a secure backend interface, and then provide it to the subscriber device 12 and also deposit the retrieved content into the local cache 46 for future use—at least if the retrieved content is known or determined to be popular or to otherwise be a candidate for local caching.

As an alternative, the content provider DN 74 within the network data center 30 may decide not to service the secure content request and instead instructs the serving packet gateway 22 to send the subsequent packets in the session towards the targeted external content provider 16, rather than diverting them to the network data center 30. At the same time, the content provider DN 74 forwards the negotiated session key previously exchanged with the subscriber device 12, and also the IP address and requested content identifier—e.g., URL—on to the targeted external content provider 16. For example, the content provider DN 74 may use TCP connection passing techniques as are known in the art.

Consider a first use case in detail, involving secure content delivery to a subscriber device 12 via a dedicated content provider DN 74 in the network data center 30. Referring to steps 1 to 3 in FIG. 7, the subscriber device 12 sends a secure connection request targeting the external content provider 16-1, CP1-OS. The request is to set up a secure connection, e.g., an HTTPS connection. The CP1-OS designation appears in the Fully Qualified Domain Name, FQDN, of the request Uniform Resource Locator, URL. The request arrives in at the serving packet gateway 22, which is configured herein to send all such secure connection requests to the RR 72 in the network data center 30—rather than the conventional approach of simply forwarding them along to the packet data network gateway 28, for sending to the targeted external content providers 16.

The RR 72 checks the destination—via the FQDN—to see if the account for the targeted content provider 16 is in its managed list or not. For example purposes, assume that the RR 72 determines that the targeted content provider 16 is registered and that there is a dedicated DN 74 in the network data center 30. As such, the RR 72 forwards the secure connection request to the dedicated DN 74 and the secure connection is established between the subscriber device 12 and the content provider DN 74, according to step 7 to 8.

Via the secure connection, the subscriber device 12 sends a request for the desired content and the content provider DN 74 retrieves the content identity from the request URL, and then determines whether the requested content is available from the content cache 46. Assuming that the targeted content is not found in the content cache 46, the content provider DN 74 sends the request to the targeted external content provider 16, to fetch the contentrefer to steps 9 to 12. After receiving the content from the external content provider 16, the content provider DN 74 decides to cache the content based upon the popularity of the content, and it sends the content to the subscriber device 12, via the serving packet gateway 22, etc.—see steps 13 and 14. On the other hand, if the requested content is already resident in the content cache 46, the content provider DN 74 validates the content and sends the validated content to the subscriber device 12. When content delivery is complete, the subscriber device 12 and the network 10 tear down the secure connection—refer to steps 15 to 18.

Figure 8A:
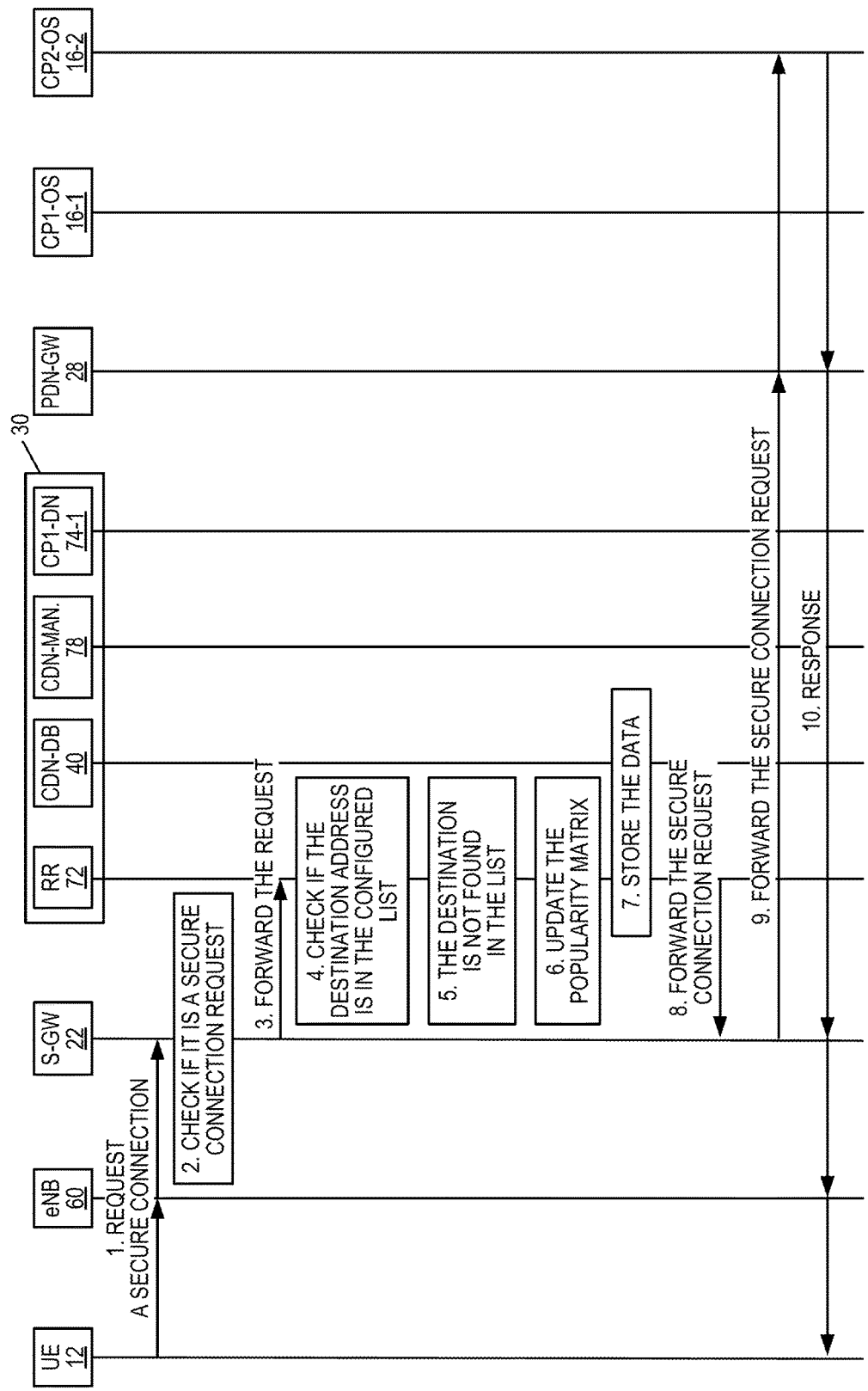
Figure 8B:
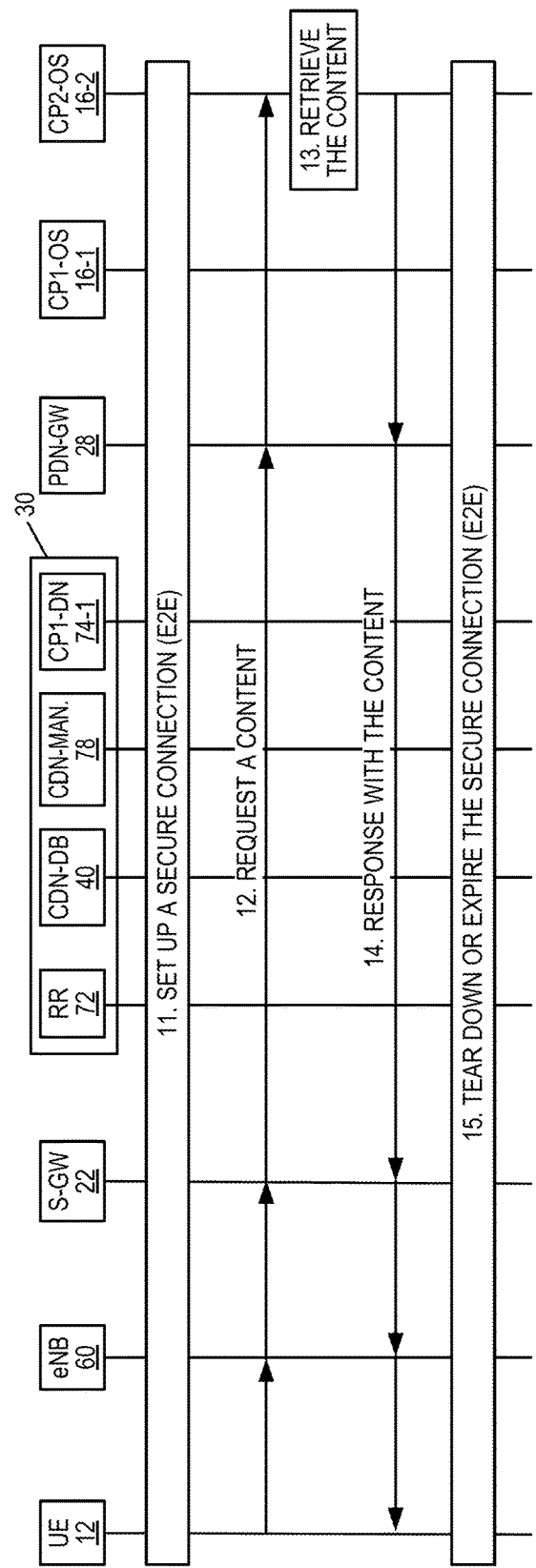

FIG. 8 illustrates another example use case involving secure content delivery directly from a targeted external content provider 16. Referring to step 1 to 3 in FIG. 8, the subscriber device 12 sends a secure connection request that targets a particular external content provider 16. Again, the targeted content provider 16 is identified in the request, e.g., in the FQDN of the request URL. The request arrives in the serving packet gateway 22, which is configured to redirect secure connection requests, at least initially, to the RR 72 in the network data center 30, rather than sending them along towards the packet data network gateway 28.

The RR 72 checks the destination to see if the network data center 30 has an account for the targeted content provider 16 in its registration data store 42. For discussion purposes, assume that the RR 72 determines that the targeted external content provider 16 is not registered in the network data center 30 and therefore forwards the request towards the targeted external content provider 16 via the serving packet gateway 22 and the packet data gateway 28—see steps 4 to 9. As a consequence of this forwarding, the secure connection is built between the subscriber device 12 and the targeted external content provider 16—see steps 10 and 11—instead of being established between the network data center 30 and the subscriber device 12. Accordingly, the targeted external content provider 16 provides the content directly to subscriber device 12, in response to receiving the request as forwarded from the network data center 30.

Figure 9A:
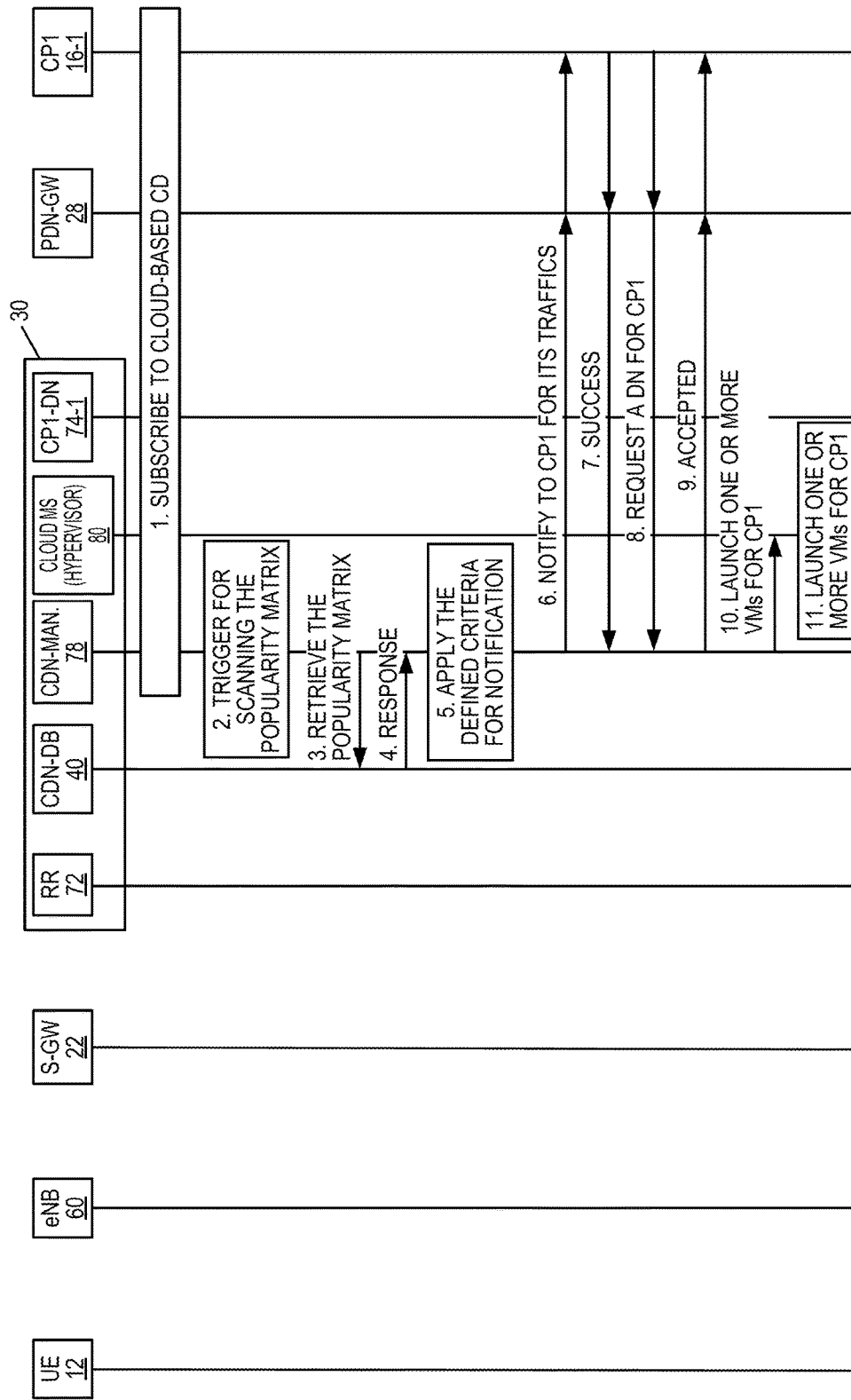
Figure 9B:
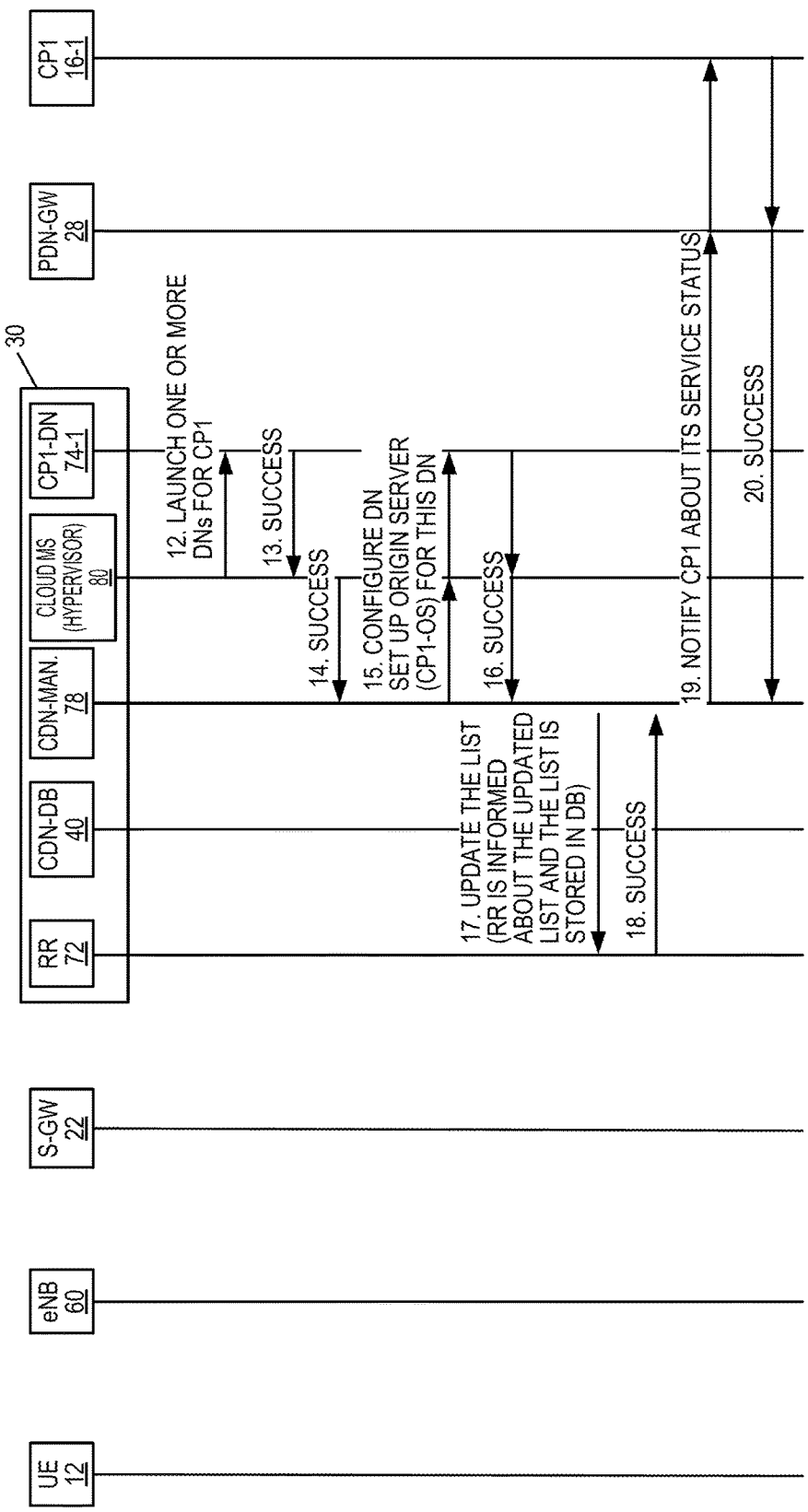

FIG. 9 illustrates a further example, and in particular illustrates one embodiment of a process for setting up a content provider DN 74 within the network data center 30. Referring to step 1 in the diagram, the external content provider 16 subscribes, e.g., via web portal access, to receive notifications from the network data center 30 or other entity of the network 10, related to traffic matrix details or report. For example, the CDN Manager 78 is configured to scan or track content popularity, or scan a popularity matrix from time to time, where the assessment interval may be configured as shown in step 2.

The CDN Manager 78, for example, retrieves a popularity matrix and applies the defined criteria for notifying subscribed content providers 16. The CDN 78 in an example case determines from the popularity matrix that the external content provider 16-1 is associated with high traffic loads in the network 10 and it sends a corresponding indication or message to the content provider 16-1, e.g., via the packet data network gateway 28.

In response to receiving that indication, the content provider 16-1 sends a request to the CDN-Manager 78 via the packet data network gateway 28—refer to steps 6 to 9—and the CDN Manager 78 in response to that request sets up a content provider DN 74 in the network data center 30 for the content provider 16-1. For example, the CDN Manager 78 initiates the launch of one or more VMs, which are used to instantiate a content provider DN 74 for the content provider 16-1—refer to steps 10 to 14. Further, the CDN Manager 78 configures an "origin server" or OS of the content provider 16-1, with information regarding the content provider DN 74—see step 15 and 16. Such information comprises, for example, IP address and content path for the content provider DN 74. Still further, the CDN Manager 78 instructs the RR 72 to add registration information for the content provider 16-1 to the registration data store 42, and to send a notification to the content provider 16-1 regarding the status of the content provider DN 74 established for it in the network data center 30—see steps 17 and 20. Status information comprises, for example, "booting", "ready", "receiving content", etc.

Figure 10:
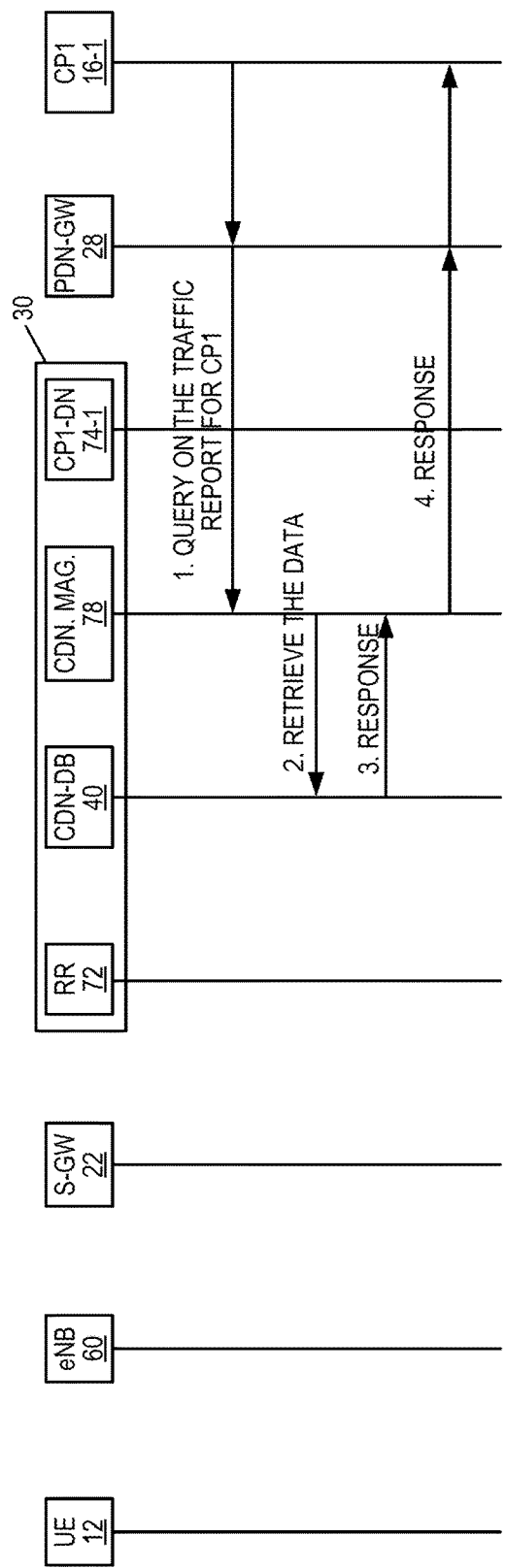

FIG. 10 illustrates another operation or feature of the contemplated network data center 30 according to one or more embodiments. The example involves an external content provider 16 querying the CDN Manager 78 of the network data center 30 for traffic reports. These reports provide information to the content provider 16 regarding content associated with the content provider 16 and distinguishes between content as delivered through the network 10 directly from the content provider 16 versus content as delivered from the local cache 46 of the network data center 30 on behalf of the content provider 16. See steps 1-4 in the diagram for example signaling.

Consider further example details related to connection passing as contemplated in some embodiments herein. As contemplated herein, in cases where the network data center 30 decides that it cannot or will not service a given secure connection, it advantageously transfers the secure connection to the external content provider 16 originally targeted for that connection. This transfer obviates the need for the subscriber device 12 to "start over" in requesting a secure connection from the targeted external content provider 16.

As previously explained, a given subscriber device 12 transmits a secure connection request to the network 10. The secure connection request identifies an external content provider 16, e.g., via a FQDN included in the request. The request arrives at the serving packet data gateway 22. Conventionally, the request would be forwarded along to the packet data network gateway 28, for forwarding via the external data network 14 to the targeted external content provider 16. Here, however, the serving packet gateway 22 diverts the request to the network data center 30.

The RR 72 or other processing entity in the network data center 30 checks the destination of the request, to determine whether or not the targeted external content provider 16 is registered in the network data center 30. Assuming so, the RR 72 forwards the request to the corresponding content provider 74 DN in the network data center 30, and the content provider DN 74 establishes a secure connection with the subscriber device 12. In one example, the secure connection is established using the TLS protocol and involves the negotiation of a session key Ks between the subscriber device 12 and the content provider DN 74. For example, the session key Ks is established during a TLS handshake phase.

The subscriber device 12 then sends the request for the particular content desired, where that request comes over the secure connection. Thus, having the secure connection established between the network data center 30 and the subscriber device 12 advantageously allows the network data center 30 to learn the identity of the content desired by the subscriber device 12. Contrastingly, if the secure connection were anchored externally at the targeted external content provider 16, such information would pass transparently through the network 10 over the secure connection between the subscriber device 12 and the targeted external content provider 16.

However, in this example, one may assume that the CDN Manager 78 determines that the desired content is not available from the local content cache 46, and one may further assume that the CDN Manager 78 is not configured to fetch the desired content into the content cache 46 for delivery to the subscriber device 12, or decides not to perform such fetching for any number of reasons. As such, the CDN Manager 78 undertakes transfer of the secure connection to the targeted external content provider 16.

To do so, the network data center 30 instructs the serving packet gateway 22 to forward all subsequent packets from the subscriber device 12 for the session to the targeted external content provider 16, rather than diverting them to the network data center 30. Further, the network data center 30 sends the relevant session information to the targeted external content provider 16, and may uses its own secure session with the targeted external content provider 16 to do so. In any case, the session information includes, for example, the negotiated session key Ks, the IP address of the involved subscriber device 12, and a content identifier that identifies the desired content. The session information in this example case further includes the TCP session information necessary to pass the TCP connection to pass the secure session from the network data center 30 to the targeted external content provider 16. All subsequent session packets pass between the subscriber device 12 and the targeted external content provider 16.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What claimed is:

1. A method of providing content over a secure connection to a subscriber device of a telecommunication network comprising:
    receiving a secure connection request from the subscriber device, said secure connection request being received at a first communication interface of a network data center that is internal to the telecommunication network and being directed to an external network address associated with an external content provider that is external to the telecommunication network;

determining whether or not the external content provider is registered for secure-content caching in the network data center; and responsive to determining that the external content provider is registered:

establishing a secure session between the network data center and the subscriber device, including establishing a session key for encrypting communications over the secure session;

determining whether the content targeted by the secure connection request is available from a content cache of the network data center;

responsive to determining that the content targeted by the secure connection request is available from the content cache, delivering the content targeted by the secure connection request from the content cache to the subscriber device using the secure session; and responsive to determining that the content targeted by the secure connection request is not available from the content cache:

initiating a takeover of the secure session by the external content provider by forwarding session information towards the external content provider via a second communication interface of the network data center, said session information including the session key, a network address of the subscriber device, and identification of the content targeted by the secure connection request; and instructing the telecommunication network to forward all subsequent session messages from the subscriber device for the secure session towards the external content provider rather than towards the network data center.

2. The method of claim 1, wherein receiving the secure connection request from the subscriber device comprises receiving the secure connection request as forwarded from a serving packet gateway of the telecommunication network, and wherein the network data center communicates with the serving packet gateway via the first communication interface.

3. The method of claim 2, wherein instructing the telecommunication network to forward all subsequent session messages from the subscriber device for the secure session towards the external content provider rather than towards the network data center comprises sending control signaling to the serving packet gateway via the first communication interface.

4. The method of claim 1, wherein the external content provider comprises an external content delivery network that is accessible via one or more external packet data networks, and wherein initiating the takeover of the secure session by the external content provider comprises initiating a communication with the external content delivery network via the second communication interface.

5. The method of claim 1, wherein initiating the takeover of the secure session by the external content provider comprises transferring a protocol endpoint established at the network data center for the secure session to the external content provider.

6. The method of claim 5, wherein transferring the protocol endpoint comprises performing a Transfer Control Protocol Connection Passing, TCPCP, operation, to pass a TCP endpoint from the network data center to the external content provider, or transferring a Transport Layer Security, TLS, protocol endpoint from the network data center to the external content provider.

7. The method of claim 1, wherein determining whether or not the external content provider is registered for secure-content caching in the network data center comprises accessing a registration data store in the network data center to determine whether the registration data store contains registration information corresponding to domain name information conveyed in the secure connection request.

8. The method of claim 1, wherein determining whether the content targeted by the secure connection request is available from the content cache of the network data center comprises accessing a content-listing data store in the network data center to determine whether the content-listing data store contains listing information corresponding to a content identifier conveyed in the secure connection request.

9. A network data center configured for operation in a telecommunication network and further configured for providing content over a secure connection to a subscriber device of the telecommunication network, said network data center comprising at least one network node that comprises:

a first communication interface configured to receive a secure connection request from the subscriber device, said secure connection request being directed to an external network address associated with an external content provider that is external to the telecommunication network; and processing circuitry configured to determine whether or not the external content provider is registered for secure-content caching in the network data center; and responsive to determining that the external content provider is registered:

establish a secure session between the network data center and the subscriber device, including establishing a session key for encrypting communications over the secure session;

determine whether the content targeted by the secure connection request is available from a content cache of the network data center;

responsive to determining that the content targeted by the secure connection request is available from the content cache, deliver the content targeted by the secure connection request from the content cache to the subscriber device using the secure session; and responsive to determining that the content targeted by the secure connection request is not available from the content cache:

initiate a takeover of the secure session by the external content provider by forwarding session information towards the external content provider via a second communication interface of the network data center, said session information including the session key, a network address of the subscriber device, and identification of the content targeted by the secure connection request; and instruct the telecommunication network to forward all subsequent session messages from the subscriber device for the secure session towards the external content provider rather than towards the network data center.

10. The network data center of claim 9, wherein the first communication interface is configured to receive the secure connection request as forwarded from a serving packet gateway of the telecommunication network.

11. The network data center of claim 10, wherein the processing circuitry is configured to instruct the telecommunication network to forward all subsequent session messages from the subscriber device for the secure session towards the external content provider by sending control signaling to the serving packet gateway via the first communication interface.

12. The network data center of claim 9, wherein the external content provider comprises an external content delivery network that is accessible via one or more external packet data networks, and wherein the processing circuitry is configured to initiate the takeover of the secure session by the external content provider by initiating a communication with the external content delivery network via the second communication interface.

13. The network data center of claim 9, wherein the processing circuitry is configured to initiate the takeover of the secure session by the external content provider by transferring a protocol endpoint established at the network data center for the secure session to the external content provider.

14. The network data center of claim 13, wherein the processing circuitry is configured to transfer the protocol endpoint based on performing a Transfer Control Protocol Connection Passing, TCPCP, operation, to pass a TCP endpoint from the network data center to the external content provider, or by transferring a Transport Layer Security, TLS, protocol endpoint from the network data center to the external content provider.

15. The network data center of claim 9, wherein the processing circuitry is configured to determine whether or not the external content provider is registered for secure-content caching in the network data center by accessing a registration data store in the network data center to determine whether the registration data store contains registration information corresponding to domain name information conveyed in the secure connection request.

16. The network data center of claim 9, wherein the processing circuitry is configured to determine whether the content targeted by the secure connection request is available from the content cache of the network data center by accessing a content-listing data store in the network data center to determine whether the content-listing data store contains listing information corresponding to a content identifier conveyed in the secure connection request.

* * * * *